(12) United States Patent
Le et al.

(10) Patent No.: US 11,817,796 B2
(45) Date of Patent: Nov. 14, 2023

(54) RECTIFIER DYNAMIC BOOST

(71) Applicant: Avago Technologies International Sales Pte. Limited, Singapore (SG)

(72) Inventors: Jim Le, Fort Collins, CO (US); John Walley, Ladera Ranch, CA (US); Marc Keppler, Windsor, CO (US)

(73) Assignee: Avago Technologies International Sales Pte. Limited, Singapore (SG)

( * ) Notice: Subject to any disclaimer, the term of this patent is extended or adjusted under 35 U.S.C. 154(b) by 0 days.

(21) Appl. No.: 17/872,285

(22) Filed: Jul. 25, 2022

(65) Prior Publication Data
US 2023/0283196 A1    Sep. 7, 2023

Related U.S. Application Data

(60) Provisional application No. 63/316,579, filed on Mar. 4, 2022.

(51) Int. Cl.
*H02M 7/219*    (2006.01)
*H04B 5/00*    (2006.01)
(Continued)

(52) U.S. Cl.
CPC ............ *H02M 7/219* (2013.01); *H02J 50/12* (2016.02); *H02M 1/0003* (2021.05); *H04B 5/0037* (2013.01)

(58) Field of Classification Search
CPC .................................. H02J 50/00; H04B 5/00
See application file for complete search history.

(56) References Cited

U.S. PATENT DOCUMENTS

| | | | |
|---|---|---|---|
| 6,115,267 A * | 9/2000 | Herbert | ................. H02M 7/217 363/25 |
| 8,217,621 B2 | 7/2012 | Tsai et al. | |

(Continued)

FOREIGN PATENT DOCUMENTS

EP        1729187 B1    6/2010

OTHER PUBLICATIONS

Have, Christopher, et al., "Resonant Full-Bridge Synchronous Rectifier Utilizing 15 V GaN Transistors for Wireles Power Transfer Applications Following AirFuell Standard Operating at 6.78 MHz", 2018, IEEE Applied Power Electronics Conference and Exposition (APEC). (Year: 2018).*

(Continued)

*Primary Examiner* — Adi Amrany
(74) *Attorney, Agent, or Firm* — Quarles & Brady LLP

(57) ABSTRACT

A system for rectifying power is disclosed. The system includes a switch network that includes a plurality of switches configured to receive wireless power input and generate a rectified voltage. The system further includes a first conductor coupled to the first receiver and the switch network configured to transmit a first alternating current to the switch network. The system further includes a second conductor electrically coupled to the first receiver and the switch network, configured to transmit a second alternating current having a second voltage to the first receiver. The system further includes a controller configured to determine a rectified voltage signal and to transmit an input to at least one switch of the plurality of switches based on the rectified voltage signal to change an ON/OFF state of the at least one switch of the plurality of switches, modifying the voltage.

17 Claims, 8 Drawing Sheets

(51) Int. Cl.
*H02J 50/12* (2016.01)
*H02M 1/00* (2006.01)

(56) References Cited

U.S. PATENT DOCUMENTS

| | | | | |
|---|---|---|---|---|
| 8,955,757 | B2* | 2/2015 | Jung | H02J 50/20 |
| | | | | 235/492 |
| 10,122,220 | B2 | 11/2018 | Sankar | |
| 10,498,160 | B2 | 12/2019 | Desai et al. | |
| 10,516,341 | B1* | 12/2019 | Fu | H02M 3/33592 |
| 10,840,742 | B2* | 11/2020 | de Rooij | H02J 50/12 |
| 11,309,716 | B2 | 4/2022 | Li et al. | |
| 2015/0349538 | A1* | 12/2015 | Agostinelli | H04B 5/0081 |
| | | | | 307/104 |
| 2015/0372626 | A1* | 12/2015 | Bartl | G01P 3/48 |
| | | | | 322/91 |
| 2018/0198596 | A1* | 7/2018 | Restle | G06F 1/12 |
| 2018/0226834 | A1 | 8/2018 | Chen | |
| 2019/0074721 | A1 | 3/2019 | Cheng et al. | |
| 2019/0089571 | A1* | 3/2019 | Von Novak, III | H04L 1/0003 |
| 2019/0149060 | A1* | 5/2019 | Tritschler | H02M 7/217 |
| | | | | 307/31 |
| 2020/0366120 | A1 | 11/2020 | Yuan et al. | |
| 2020/0381945 | A1* | 12/2020 | Wang | H02J 50/90 |
| 2021/0135666 | A1* | 5/2021 | Wang | B60L 58/10 |
| 2022/0360117 | A1* | 11/2022 | Stingu | H02M 7/219 |
| 2023/0099911 | A1* | 3/2023 | Cheong | H02J 50/90 |
| | | | | 320/108 |

OTHER PUBLICATIONS

Extended European Search Report, EP-23157958.2, dated Jul. 4, 2023, 11 pages.

\* cited by examiner

RECTIFIER DYNAMIC BOOST

CROSS REFERENCE TO RELATED APPLICATIONS

The present disclosure claims the benefit under 35 U.S.C. § 119(e) of U.S. Provisional Patent Application Ser. No. 63/316,579, filed Mar. 4, 2022, entitled RECTIFIER DYNAMIC BOOST, naming Jim Le, John Walley, and Marc Keppler as inventors, which is incorporated herein by reference in the entirety.

BACKGROUND

Many communication devices (e.g., smartphones, tablets) use wireless power transfer (WPT) as a method to charge the battery within the communication device without the need for a compatible plug-in charger. In this manner, WPT transmitters from different manufacturers are able to charge the same communication device having WPT reception capability. However, devices capable of receiving wireless power may at times receive an alternating current that, when rectified, produces a rectified voltage ($V_{rect}$), that is too weak or too noisy (e.g., oscillating/rippling waveforms) for operation of the device and/or recharging of the device battery.

Accordingly, it is desirable to provide a WPT boost system and method that enables efficient charging of user devices and other communication devices.

SUMMARY

A system for rectifying power is disclosed. In one or more embodiments, the system includes a first circuit for a first apparatus. In one or more embodiments, the system further includes a first receiver configured to receive a wireless power input from a second apparatus. In one or more embodiments, the system further includes a switch network that includes a plurality of switches, wherein the switch network is electrically coupled to the first conductor, wherein the switch network is further configured to rectify the wireless power input and generate a rectified voltage. In one or more embodiments, the system further includes a first conductor electrically coupled to the first receiver and the switch network, wherein the first conductor is configured to transmit a first alternating current having a first voltage to the switch network. In one or more embodiments, the system further includes a second conductor electrically coupled to the first receiver and the switch network, wherein the first conductor is configured to transmit a second alternating current having a second voltage to the first receiver. In one or more embodiments, the system further includes a first controller configured to determine a rectified voltage signal. In one or more embodiments, the first controller is further configured to transmit a signal input to at least one switch of the plurality of switches based on the rectified voltage signal to change an ON/OFF state of the at least one switch of the plurality of switches, wherein a resultant change of the ON/OFF state of the at least one switch modulates the rectified voltage.

This Summary is provided solely as an introduction to subject matter that is fully described in the Detailed Description and Drawings. The Summary should not be considered to describe essential features nor be used to determine the scope of the Claims. Moreover, it is to be understood that both the foregoing Summary and the following Detailed Description are example and explanatory only and are not necessarily restrictive of the subject matter claimed.

BRIEF DESCRIPTION OF THE DRAWINGS

The detailed description is described with reference to the accompanying figures. The use of the same reference numbers in different instances in the description and the figures may indicate similar or identical items. Various embodiments or examples ("examples") of the present disclosure are disclosed in the following detailed description and the accompanying drawings. The drawings are not necessarily to scale. In general, operations of disclosed processes may be performed in an arbitrary order, unless otherwise provided in the claims. In the drawings:

DETAILED DESCRIPTION

Figure 1:
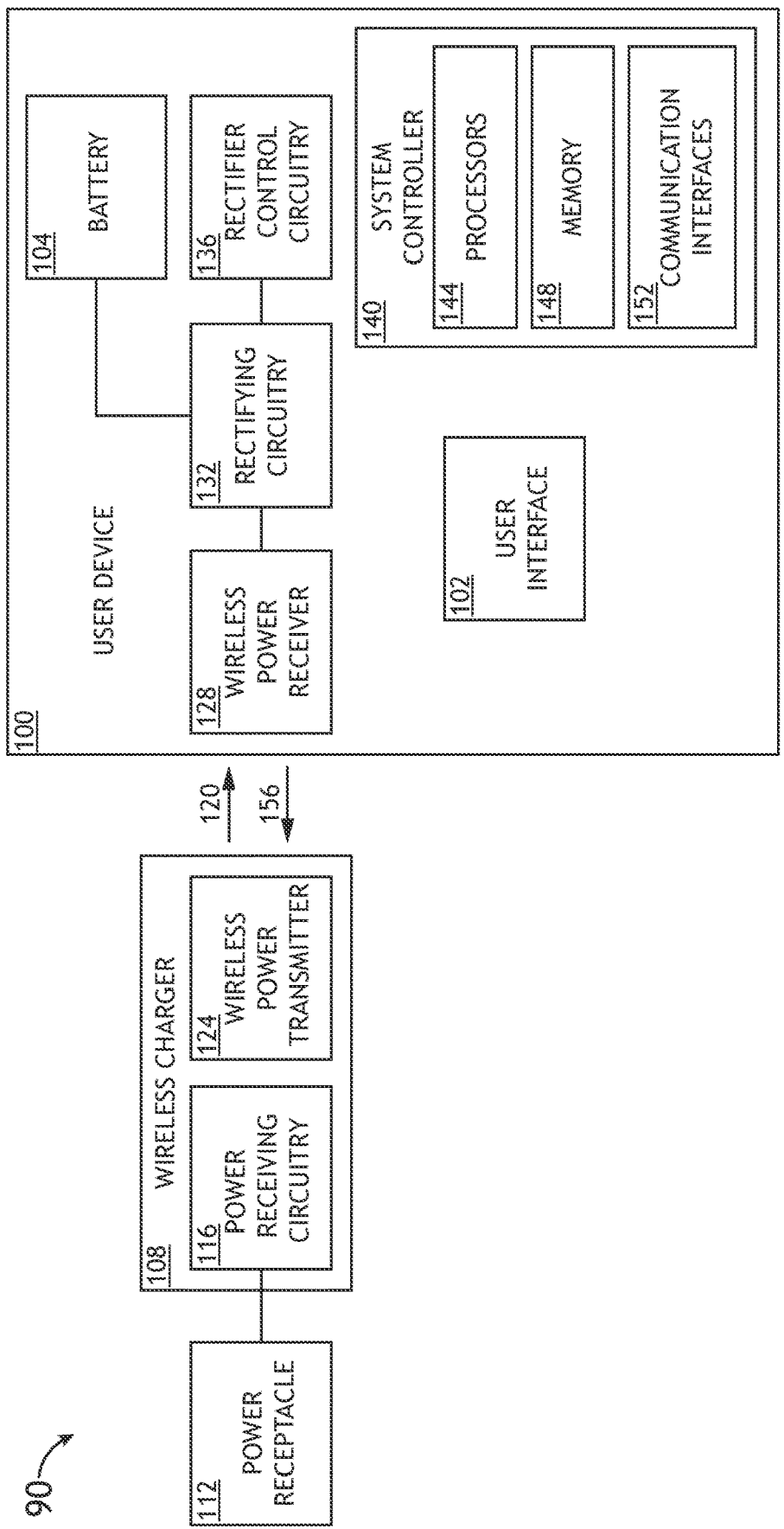
FIG. 1 is a block diagram of an environment for a user device, in accordance with one or more embodiments of the disclosure.

Before explaining one or more embodiments of the disclosure in detail, it is to be understood that the embodiments are not limited in their application to the details of construction and the arrangement of the components or steps or methodologies set forth in the following description or illustrated in the drawings. In the following detailed description of embodiments, numerous specific details may be set forth in order to provide a more thorough understanding of the disclosure. However, it will be apparent to one of ordinary skill in the art having the benefit of the instant disclosure that the embodiments disclosed herein may be practiced without some of these specific details. In other instances, well-known features may not be described in detail to avoid unnecessarily complicating the instant disclosure.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only and should not be construed to limit the disclosure in any way unless expressly stated to the contrary.

Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of "a" or "an" may be employed to describe elements and components of embodiments disclosed herein. This is done merely for convenience and "a" and "an" are intended to include "one" or "at least one," and the singular also includes the plural unless it is obvious that it is meant otherwise.

It is to be understood that depicted architectures are merely exemplary and that many other architectures can be implemented which achieve the same functionality. In a conceptual sense, any arrangement of components to achieve the same functionality is effectively "associated" such that the desired functionality, common goal, objective, and/or result is achieved. Hence, any two components herein combined to achieve a particular functionality can be seen as "associated with" each other such that the desired functionality, common goal, objective, and/or result is achieved, irrespective of architectures or intermedial components. Likewise, any two components so associated can also be viewed as being "connected," or "coupled," to each other to achieve the desired functionality, and any two components capable of being so associated can also be viewed as being "couplable," to each other to achieve the desired functionality (e.g., "operatively couplable" or electrically coupled"). Additionally, unless otherwise indicated, a description indicating that one component is "connected to" another component or "between" two components indicates that such components are functionally connected and does not necessarily indicate that such components are physically in contact. Rather, such components may be in physical contact or may alternatively include intervening elements. Similarly, descriptions that a particular component is "fabricated over" another component (alternatively "located on," "disposed on," or the like) indicates a relative position of such components but does not necessarily indicate that such components are physically in contact. Such components may be in physical contact or may alternatively include intervening elements.

It should be understood that an electrical input (e.g., power inputs, signal inputs, voltages, wireless inputs, wireline inputs) may change within a system (e.g., by processing or variances occurring at the transmission of the input) to produce an output with different characteristics. For example, an AC input may be rectified to produce a DC output. In another example, a voltage value of a rectified voltage may change after transmission along a conductor. In another example, a data signal may be derived from, or integrated into, an input signal.

Finally, as used herein any reference to "one embodiment" or "some embodiments" means that a particular element, feature, structure, or characteristic described in connection with the embodiment is included in at least one embodiment disclosed herein. The appearances of the phrase "in some embodiments" in various places in the specification are not necessarily all referring to the same embodiment, and embodiments may include one or more of the features expressly described or inherently present herein, or any combination of sub-combination of two or more such features, along with any other features which may not necessarily be expressly described or inherently present in the instant disclosure.

A wireless power transfer (WPT) receiving circuit is disclosed. The WPT receiving circuit includes wireless power receiving circuitry (e.g., coils), rectifying circuitry, and control circuitry that can modulate the voltage of an incoming power signal through the control of multiple switches within the WPT receiving circuit. For example, the control circuitry may step up the voltage of the incoming power signal (e.g., boosting), or may step down the voltage of the input signal (e.g., bucking). The control circuitry may also determine values of specific working parameters within the WPT receiving circuit and operate to increase the stability of the WPT receiving circuit based on the determined values. The WPT receiving circuit may function to charge batteries in any device and/or otherwise provide power for any device.

FIG. 1 is a block diagram of an environment 90 for a user device 100 (e.g., first apparatus), in accordance with one or more embodiments of the disclosure. The user device 100 may be configured as any type of electrically powered device. For example, the user device 100 may be configured as a mobile communication device including but not limited to a smart phone, cell phone, or tablet. In another example, the user device 100 may be configured as a media device (e.g., media playing and/or recording device). In another example, the user device 100 may be configured as a driver assistance module in a vehicle, an emergency transponder, a pager, a watch, a satellite television receiver, a stereo receiver, a computer system, music player, laptop or tablet computer, home appliance, or virtually any other electrically powered device. For instance, the user device 100 may be configured as a computing/entertainment device for a vehicle.

In embodiments, the user device 100 may be configured to communicate with a network controller, such as an enhanced Node B (eNB) or other base station. For example, the network controller may establish communication channels such as a control channel and a data channel, and exchange data via these channels. The user device 100 may be exposed to many other sources of wireless signals as well, (e.g., from a wireless charging pad or wireless router), and wireless signals may be harvested in conjunction with the WPT and techniques described below. The user device 100 may also support one or more Subscriber Identity Modules (SIMs).

The user device 100 may include a user interface 102 and a rechargeable battery 104 that powers electronic componentry within the user device 100. The battery 104 is configured to be charged using power from a wireless charger 108 (e.g., a second apparatus). For example, the wireless charger 108 may be plugged into a power receptacle 112, wherein electrical power is received by power receiving circuitry 116 within the wireless charger 108, and outputted as a wireless power signal 120 via a wireless power transmitter 124. The wireless power transmitter 124 includes at least one wire coil, and transmits the wireless power signal 120 by magnetic fields using inductive coupling to a receiving coil on a wireless power receiver 128 (e.g., a first receiver) of the user device 100. Once received, the power received from the wireless power signal 120 may be referred herein as a wireless power input. The wireless power input received by the wireless power receiver 128 as an alternating current (AC) is then rectified to an electrical current (e.g., a DC current having a voltage $V_{rect}$) by rectifying circuitry 132 as required by the user device 100 and/or battery 104, with a portion of the power used to charge the battery 104. Power reception and modulation by the wireless power receiver 128 and the rectifying circuitry 132 are controlled by rectifier control circuitry 136 (e.g., a first controller). The rectifier control circuitry 136 performs the processive functions required for wireless power reception and battery charging. The user device 100 may utilize power directly from the wireless charger 108 or the battery 104 for operation.

The user device 100 further includes a system controller 140 that includes one or more processors 144, memory 148, and a communication interface 152. The one or more processors 144 may include any processor or processing element known in the art. For the purposes of the present disclosure, the term "processor" or "processing element" may be broadly defined to encompass any device having one or more processing or logic elements (e.g., one or more micro-processor devices, one or more application specific integrated circuit (ASIC) devices, one or more field programmable gate arrays (FPGAs), one or more digital signal processors (DSPs), or a state device). In this sense, the one or more processors 144 may include any device configured to execute algorithms and/or instructions (e.g., program instructions stored in memory 148).

The memory 148 may include any storage medium known in the art suitable for storing the one or more sets of program instructions executable by the associated one or more processors 144. For example, the memory 148 may include a non-transitory memory medium. For instance, the memory 148 may include, but is not limited to, a read-only memory (ROM), a random-access memory (RAM), a magnetic or optical memory device (e.g., disk), a magnetic tape, a solid-state drive, and the like. The memory 148 may be configured to provide information to the system controller 140, or other components of the user device 100. In addition, the memory 148 may be configured to store user input. The memory 148 may be housed in a common controller housing with the one or more processors 144. The memory 148 may, alternatively or in addition, be located remotely with respect to the spatial location of the processors 144, or the system controller 140. For example, the one or more processors 144 and/or the system controller 140 may access a remote memory 148 accessible through a network (e.g., wireless, and the like) via one or more communication interfaces 152.

The one or more communication interfaces 152 may be operatively configured to communicate with components of the system controller 140 or any other componentry within the user device 100. For example, the one or more communication interfaces 152 may be configured to retrieve data from the one or more processors 144 or other devices, transmit data for storage in the memory 148, retrieve data from storage in the memory 148, and so forth. The one or more communication interfaces 152 may also be operatively coupled with the one or more processors 144 to facilitate data transfer between components of the system controller 140, and the user device 100, including the rectifying circuitry 132 and/or rectifier control circuitry 136. It should be noted that while the one or more communication interfaces 152 are described as a component of the system controller 140, one or more components of the one or more communication interfaces 152 may be implemented as external components operatively coupled to the system controller 140 via a wired and/or wireless connection. It should also be noted that the rectifier control circuitry 136 may also include one or more processors 114, memory, 148, and communication interfaces 152 to perform the functions described herein.

In embodiments, the user device is configured to communicate unidirectionally and/or bidirectionally with the wireless charger 108 via a wireless communication signal 156 (e.g., controlled by the system controller 140 or the rectifier control circuitry 136). The wireless communication signal 156 may be communicated via induction of the coils of the wireless charger 108 and/or the user device 100, or through other wireless signaling methods including but not limited to Bluetooth, WIFI, and ZigBee. Communication from the user device 100 to the wireless charger 108 creates a feedback loop wherein the user device 100 can command the wireless charger 108 to change the current state of the wireless power transmitter 124 (e.g., to increase the wireless power signal 120 due to weak reception). For example, the wireless power receiver 128 may be configured to transmit a signal (e.g., an amplitude shift keying (ASK) signal, a frequency shift keying (FSK) signal, or other modulation-based signal) to the wireless power transmitter 124, and the wireless power transmitter may be configured to receive and process the signal. The wireless power receiver 128 may also configured to receive and process a communication signal (e.g., ASK, FSK, or another modulated signal).

Figure 2A:
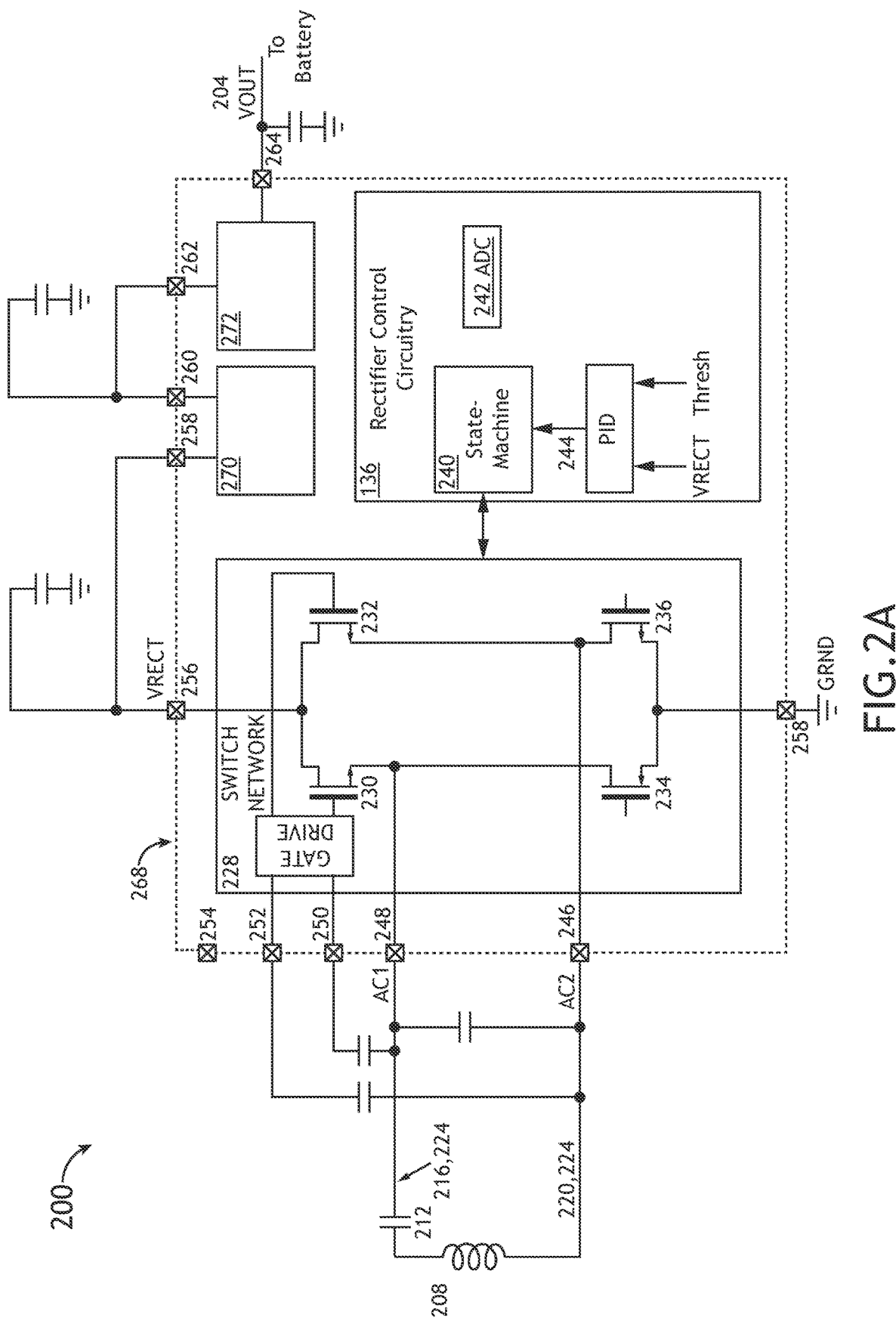
FIGS. 2A-2B are circuit diagrams illustrating a rectifier circuit, in accordance with one or more embodiments of the disclosure.

FIG. 2A is a circuit diagram illustrating a rectifier circuit 200 (e.g., a first circuit), in accordance with one or more embodiments of the disclosure. The rectifier circuit 200 may include some or all componentry of the wireless power receiver 128, the rectifying circuitry 132, and the rectifier control circuitry 136. The rectifier circuit 200 may harvest wireless power from any wireless power source. For example, the rectifier circuit 200 may harvest 6.78 MHz Alliance for Wireless Power (A4WP, also referred to as AirFuel) power transmissions. The rectifier circuit 200 facilitates efficiency improvements in receiving the transmitted energy and delivering it (e.g., as the rectified Direct Current (DC) voltage $V_{rect}$) to subsequent energy consuming stages in the device, such as to the battery 104 via $V_{out}$ 204.

Wireless power transmission suffers from efficiency losses at several stages, such as from converting a power source into a radio frequency (RF) wireless power signal transmission, receiving the RF flux of the wireless power signal 120, and converting the RF flux into a usable DC voltage in the receiving device. The wireless power receiver 128 may employ magnetic resonance achieved through matching the inductance and capacitance to the transmitter system to obtain a high Q receiver that is very responsive to a fundamental frequency of the wireless power signal 120. Common WPT frequencies range from 90 KHz-200 KHz. WPT frequencies may also include frequencies approximate to 360 KHz, and/or frequencies approximate to 6.78 MHz. Inductance may be provided by a receiving coil 208 that receives the flux of the wireless power signal. The inductance may also be provided by, for example, one or more turns of a conductor on a printed circuit board, or another type of antenna. The inductance produces an Alternating Current (AC) current and a first capacitor 212 may be tuned with respect to the receiving coil 208 to achieve the resonance that results in substantial responsiveness to the wireless power signal 120. The wireless power receiver 128 provides the AC current into the rectifier circuit 200 via the AC positive conductor (e.g., the first conductor 216) and the AC negative conductor (e.g., the second conductor 220). The first conductor 216 and the second conductor 220 may be collectively called the AC conductor 224).

The rectifier circuit 200 received the AC current and rectifies the AC current into a DC voltage, $V_{rect}$. $V_{rect}$ may then provide energy for any subsequent processing circuitry or other function of the user device 100. In one implementation, the rectifier circuit 200 is wholly or partially integrated into an integrated circuit chip 268. The integrated circuit chip 268 may also be referred to as a "device". In other implementations, discrete components may be used. A switch network 228 receives power from the first conductor 224 and includes a plurality of switches (e.g., switches 230, 232, 234, and 236) arranged to rectify the wireless power input and generate a rectified voltage. The switches 230-236 may be configured as field effect transistors (FETs) such as Metal Oxide Semiconductor FETs (MOSFETs) or other types of transistors or other types of switches. The switches 230-236 are configured such that upon receiving a signal input (e.g., a gate input), such as a feedback input based on $V_{rect}$ (e.g., a rectified voltage signal), the switch 230-236 may change an ON/OFF state. For example, the switch 230 may switch from an OFF state to an ON state upon receiving the signal input. Correspondingly, the switch may switch from an ON state to an OFF state upon receiving the signal input. Within the switch network 228, changing the ON/OFF state of one or more switches 230-236 results in a modulation of $V_{rect}$. The switch network 228 may include any number of switches 230-236. For example, the switch network 228 may include 5 or more, 10 or more, or 15 or more switches 230-236.

The rectifier control circuitry 136 is operatively coupled to the switch network 228. For example, the rectifier control circuitry 136 may control the ON and OFF states of the switches 230-236 to rectify the wireless power input using switching control outputs, producing a full-wave rectified version of the wireless power input. The rectifier control circuitry 136 may include a processing unit (e.g., state machine 240 containing one or more processors 144), an analog-digital converter (ADC 242) and a control loop mechanism, such as a proportional-integral-derivative (PID) controller 244 (e.g., analog PID or digital PID). The state machine 240 may include any finite state processor including but not limited to a central processing unit (CPU) or an application specific integrated circuit (ASIC).

The rectifier circuit 200 further includes a plurality of pinouts 246, 248, 250, 252, 254, 256, 258, 260, 262, 264 that may be accessible to the rectifier control circuitry 136. For example, the rectifier control circuitry 136 may detect a state (e.g., current, voltage, oscillation) of power via one or more pinouts 246-264 and may affect the state of the power (e.g., by injection) at one or more pinouts. For example, the rectifier control circuitry 136 may be in communication with the switch network 228, controlling switches 230, 232 to by delivering power at pinouts 250, 252, respectively (e.g., the power amplified via gate drivers 266). The pinouts 246-264 may be arranged on the integrated circuit chip 268, (e.g., the circuit chip 268 represented by dotted square). The rectifier circuit may also include current sensing circuitry 270 and voltage regulating circuitry 272.

Figure 2B:
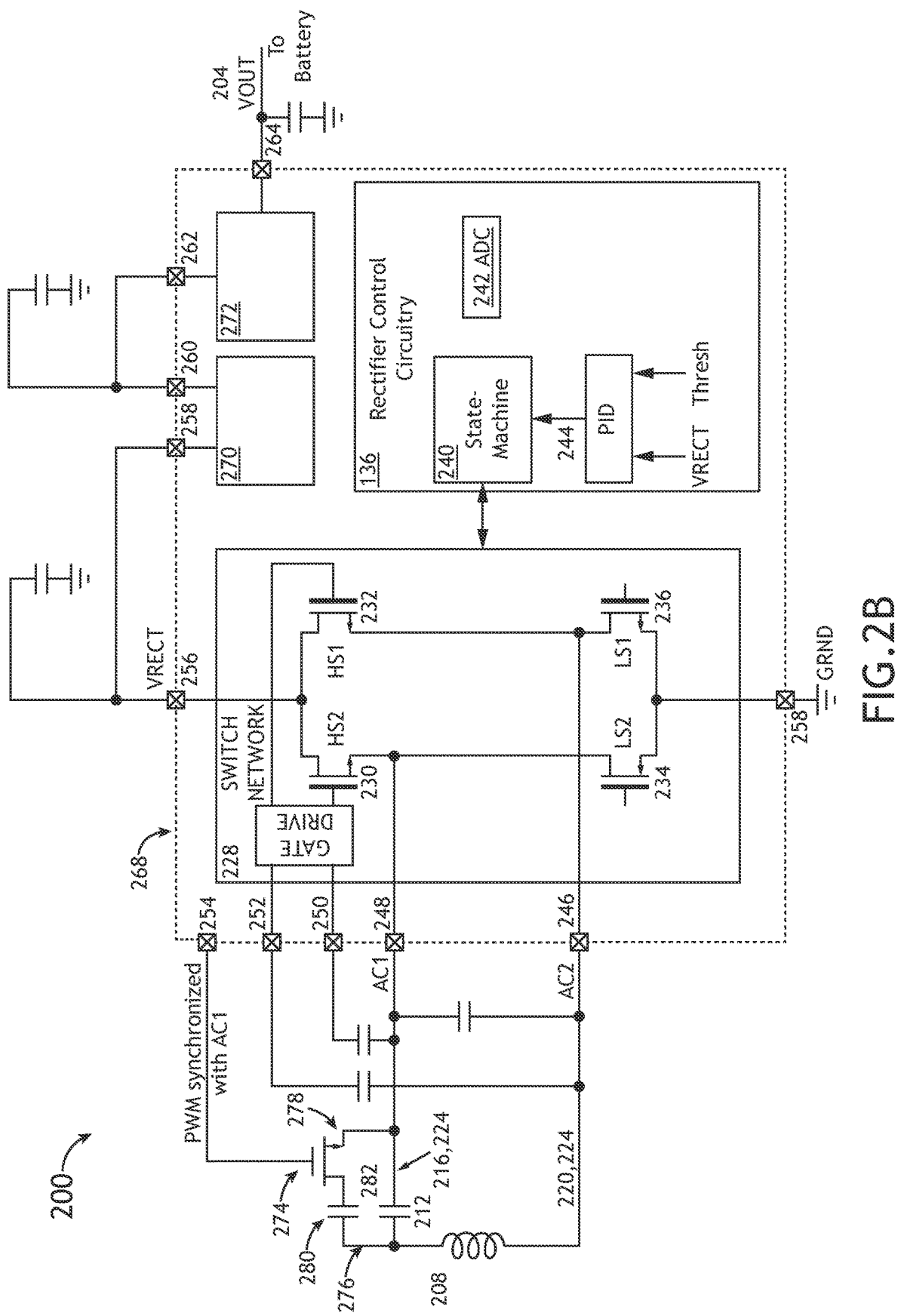

In embodiments, the rectifier circuit 200 further includes a boost switch configured to dynamically boost $V_{rect}$. For example, the switch network 228 may further include a first field effect transistor (e.g., a first FET 274) as shown in FIG. 2B, in accordance with one or more embodiments of the disclosure. The first FET 274 may be incorporated in one of several places within the rectifier circuit 200 (e.g., integrated into the integrated circuit chip 268 or outside of the integrated circuit chip 268). For example, the first FET 274 may be configured to handle high power inputs that may deleterious to the integrated circuit chip 268. The first FET 274 may therefore be disposed outside of, or physically separated from, the integrated circuit chip 268 (e.g., as an external first FET 274, also referred to as an external FET, that is not disposed within, or physically integrated into, the integrated circuit chip 268, yet electrically coupled to the integrated circuit chip 268), with other circuit componentry, such as the switch network 228, being located on, or integrated into, the integrated circuit chip 268. For example, the first FET 274 may be configured as an eternal FET that can effectively handle 115 volts or a maximum VDS of 117 volts. However, in some embodiments, the first FET 274 may be incorporated into the integrated circuit chip 268. The first FET may be configured as an insulated gate FET (MOSFET), a junction FET (JET) or a metal-semiconductor FET (MESFET). In incorporating the first FET, the drain of the first FET 274 may be coupled to the AC positive conductor 216 via a drain conductor 276 and the source of the first FET 274 may be coupled to the first conductor 216 via a source conductor 278. A second capacitor 280 may then be disposed within the drain conductor 276. This arrangement forms a FET loop 282 (e.g., the arrangement forms a first loop) with parallel capacitors (e.g., the first capacitor 212 and the second capacitor 280). The gate of the first FET 274 may be coupled to a pinout 254 that is accessible to the rectifier control circuitry 136. In this arrangement, the first FET 274/FET loop 282 acts as a dynamic capacitive switch that modulates the network reactance magnitude, which is then controllable by the rectifier control circuitry 136.

In embodiments, the first FET 274 operates to switch-in additional series capacitance on the receiver side to ensure that the WPT transfer network is inductive during boost operation. The rectifier control circuitry 136 may then create a negative-phase shift to control the boost amount. For example, the rectifier control circuitry 136, comprising a state machine and/or a loop control device (e.g., the PID 244) may adjust or apply a current limit value or current limit threshold ($I_{lim}$) (e.g., such as a rectifier turn-off current threshold) based on the rectifier voltage. For instance, making the rectifier turn-off current limit threshold more negative results in the rectifier input impedance becoming more capacitive. In another example, the rectifier control circuitry 136 modulates $V_{rect}$ by applying a pulse-width-modulation (PWM) signal to the gate of the first FET 274, effectively synchronizing the PWM signal to the AC waveform. The ability of the first FET 274 to boost an input voltage is based on the ability of the first FET 274 to dynamically modulate an impedance that is generated by power flowing through the field coil 208 and the first capacitor 212 along the AC conductor 224 to the switch network 228. For example, if the impedance of a signal along the AC conductor 224 decreases, the output signal, $V_{rect}$, increases for a given load, and the rectifier control circuitry 136 may then send a control signal to the gate of the first FET 274 to open or close the first FET 274 accordingly so that $V_{rect}$ is retained at a normal level. In some embodiments, the dynamic boosting can be implemented in the rectifier circuit via the use of a dynamic tuning capacitor.

Referring back to FIG. 2A, in embodiments, the rectifier control circuitry 136, including the state machine 240 and/or PID 244, causes a boost in $V_{rect}$ if $V_{rect}$ drops below a predetermined threshold. Drops in $V_{rect}$ can occur under transient heavy loads. For instance, transient drops in heavy loads can occur in circuitry where low dropout (LDO) regulators are used, or under capacitive buck situations. Dynamic boosting may prevent voltage collapse by keeping $V_{rect}$ to a threshold minimum.

Figure 3A:
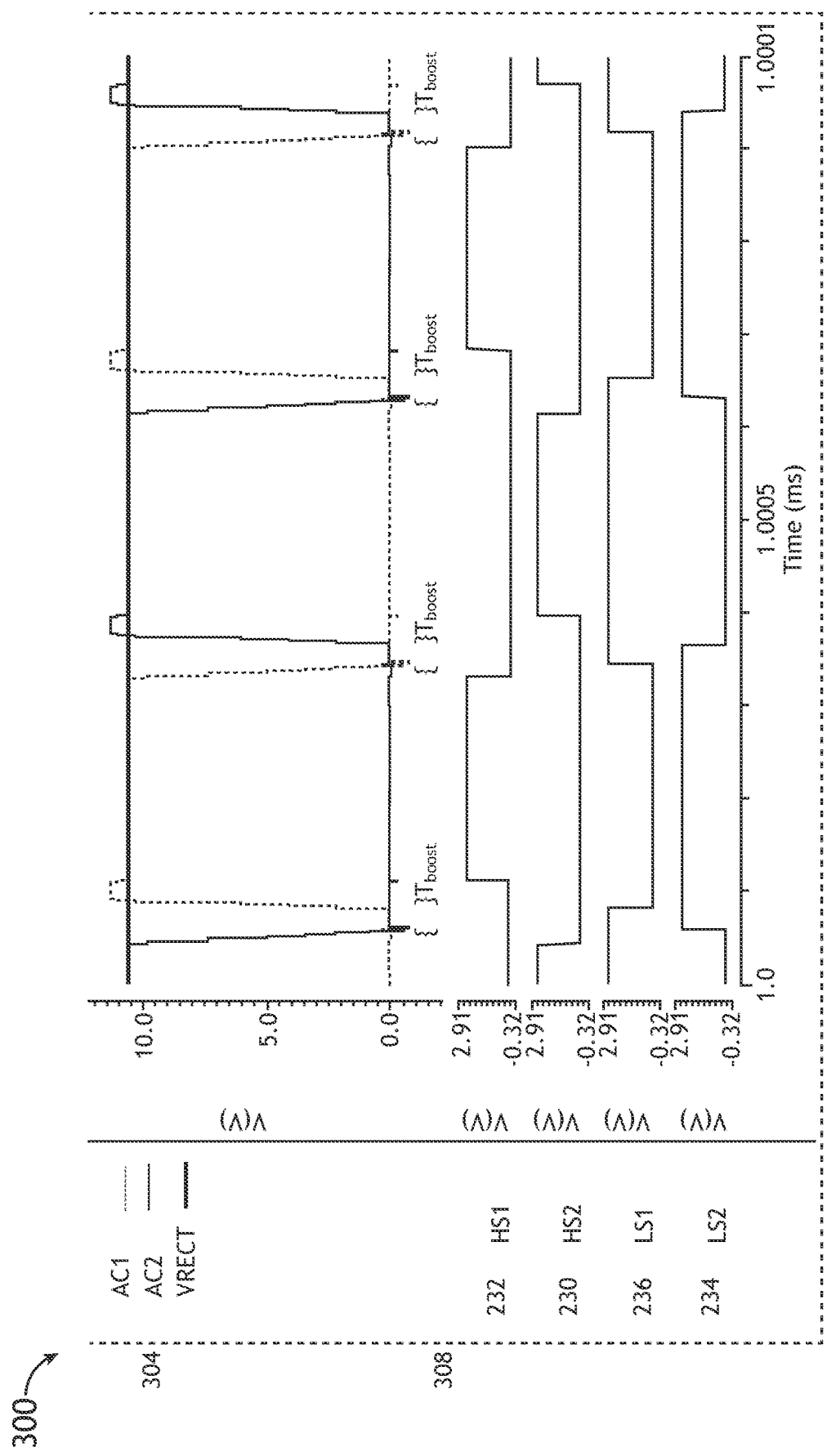
FIG. 3A is a graph illustrating a voltage/time plot for components within a rectifier circuit, in accordance with one or more embodiments of the disclosure.

The rectifier control circuitry 136 may boost $V_{rect}$ under specific conditions, as detailed below. For example, the switch network 228, controlled by the rectifier control circuitry 136, may boost $V_{rect}$ by momentarily shorting the first conductor 216 and/or the second conductor 220, as shown in FIG. 3A. FIG. 3A illustrates a graph set 300 that includes a voltage/time graph 304 illustrating waveforms of a first voltage (AC1) as measured on the first conductor 216, a second voltage (AC2) as measured on the second conductor 220, and the voltage of $V_{rect}$. The first voltage AC1, the second voltage AC2 and $V_{rect}$ are represented by a thin solid line, a dotted line, and a thin solid line, respectively. The graph set 300 also includes a graph subset 308 that indicate the ON/OFF status of the high-side switches HS1 and HS2 (e.g., switches 232, 230, respectively) and the low-side switches LS1 and LS2 (e.g., switches 236 and 234, respectively). The switching on of a switch 230, 232, 234, 236 is indicated by a rise in the measured voltage at the switch 230, 232, 234, 236 and the turning off of the switch 230, 232, 234, 236 is indicated by a corresponding voltage reduction. In this dynamic boosting scheme, coordination of switching between the switches 230, 232, 234, 236, alters the first voltage AC1 and the second voltage AC2, and maintains $V_{rect}$ at a threshold level.

In embodiments, the dynamic boosting scheme includes engaging, or switching on, both low-side switches 234, 236 following the transition of the first voltage (AC1) and/or the second voltage (AC2) from crest to trough (e.g., generally the transition from the highest, substantially highest, or near highest voltage in the waveform (crest) to the lowest, substantially lowest, or near lowest voltage in the waveform (trough). By engaging the low-side switches 234, 236, the switch network presents a duty cycle "short" to the coil 208, for which current through the coil increases due to a lowered impedance, creating a boosting effect.

The switching of the switches 230, 232, 234, 236 for the dynamic boosting scheme may be performed via one or more specific sequences. For example, the dynamic boosting scheme may include switching the second low-side switch 234 to an ON state when the second voltage AC2 has transitioned from crest to trough, and switch the second low-side switch 234 to an OFF state when the second voltage AC2 has initiated a transition from trough to crest. The dynamic boosting scheme may further include switching the first high-side switch 232 to the ON state when the first voltage AC1 has transitioned from trough to crest, and switch the first high-side switch 232 to the OFF state when the first voltage AC1 has initiated a transition from crest to trough. The dynamic boosting scheme may further include switching the first low-side switch 236 to the ON state when the first voltage AC1 has transitioned from crest to trough, and switch the first low-side switch 236 to the OFF state when the first voltage AC1 has initiated a transition from trough to crest. The dynamic boosting scheme may further include switching the second high-side switch 230 to the ON state when the second voltage AC2 has transitioned from trough to crest and switch the second high-side switch 230 to the OFF state when the second voltage AC2 has initiated transition from crest to trough In this switch sequencing example, the first low-side switch 236 and the second low-side switch 234 are both turned on for a short overlapping time period within each half cycle, termed $T_{boost}$. $T_{boost}$ is a period of transition to a high-impedance (HIZ) effect during which a momentary boost in voltage occurs (e.g., due to the current passing through an inductor (e.g., coil 208) momentarily shorting across the inductor). The inductor will then modulate the voltage in order to keep the current the same by collapsing the magnetic fields and changing the voltage across the terminals (AC1/AC2) to maintain the current (e.g., the voltage increases in order to keep the current the same). The switch sequence may be performed once per cycle, twice per cycle (e.g., as shown in FIG. 3A), or once every few cycles as needed. However, the switch sequence may be altered such that several switch sequences may be performed every cycle.

In embodiments, the switch sequencing is performed via one or more timers. For example, when the second low-side switch 234 is turned on, and the first low-side switch 236 is turned on, a $T_{boost}$ timer may be implemented, wherein the second low-side switch 234 will be shut off after a set time based on the $T_{boost}$ timer. In this manner, the $T_{boost}$ time, and the boosting effect that arises during $T_{boost}$, may be regulated. The switch sequencing may also be performed based on voltage conditions. For example, the first low-side switch 234 may be turned on when the first voltage falls below a threshold voltage, such as 20 mV.

Figure 3B:
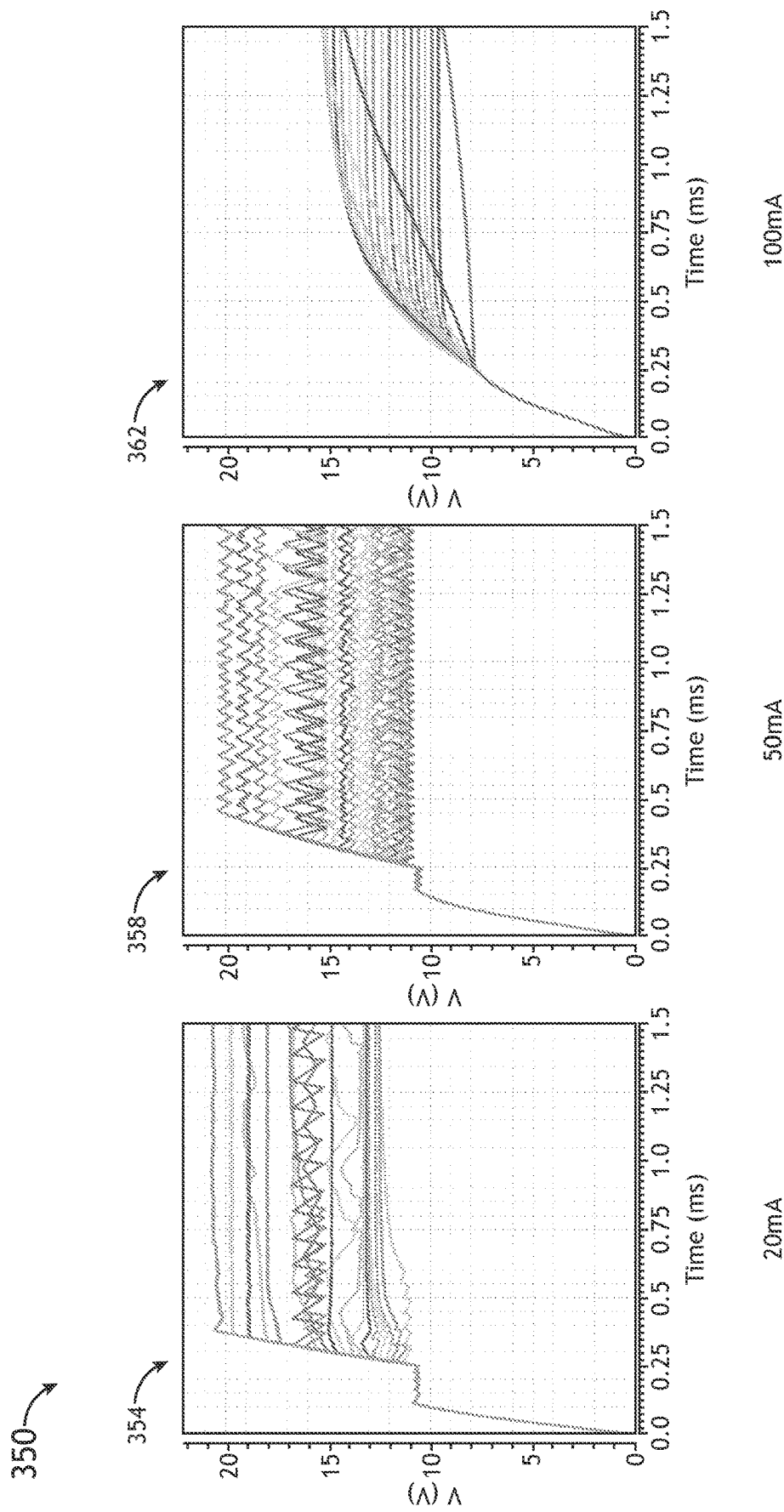
FIGS. 3B-C. are graphs illustrating voltage/time plots for a rectifier circuit under different load conditions, in accordance with one or more embodiments of the disclosure.

The effect of dynamic boosting on the rectifier circuit 200 is illustrated in graph set 350 as shown in FIG. 3B, which presents the results of $T_{boost}$ on the rectifier circuit 200 under loads of 20 mA, 50 mA, and 100 mA (graphs 354, 358, 362, respectively). Different plots within each graph 354, 358, 362 represent different $T_{boost}$ time-lengths. In general, increasing $T_{boost}$ increases the voltage boost, with specific $T_{boost}$ times increasing the rectifier voltage by up to approximately 10 volts.

Figure 3C:
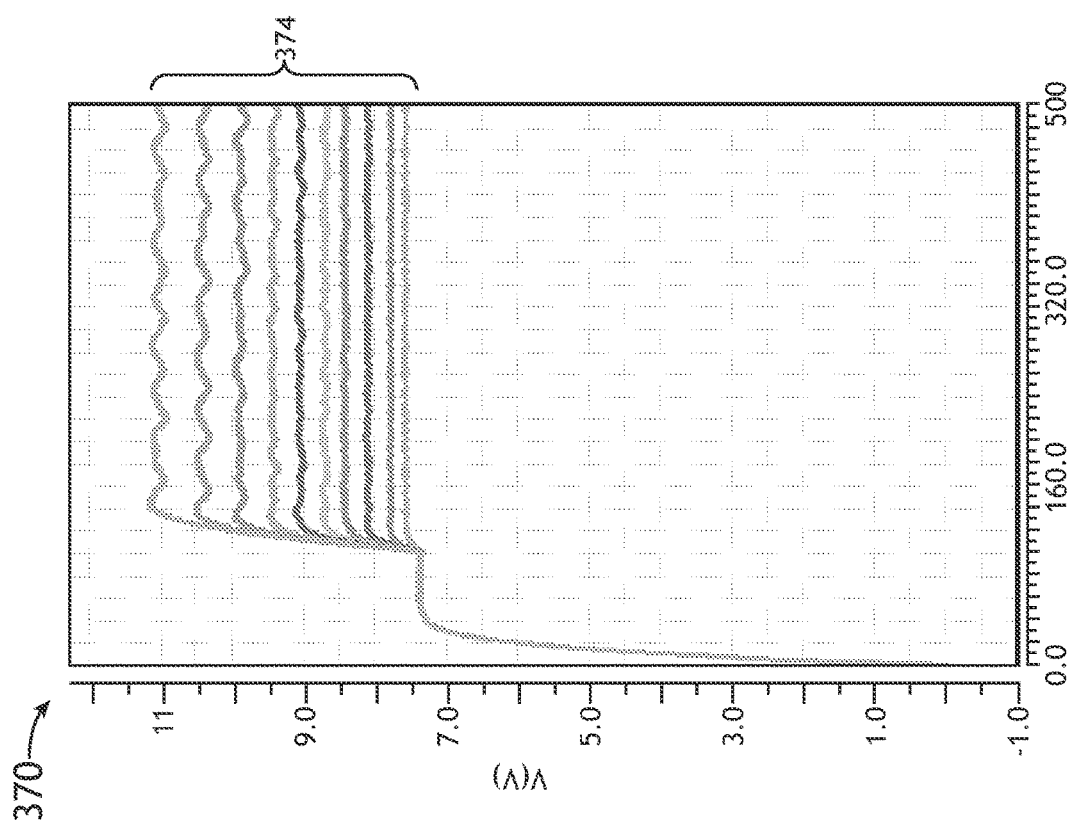

In embodiments, the increases in voltage as shown by the switch sequencing scheme may also be used for communication, such as ASK communication. As detailed above, turning on both low side switches 234, 236 causes duty cycle short, resulting in a modulated impedance on the wireless power receiver 128. The modulated impedance alters voltage levels that can be used for continuous ASK communication. FIG. 3C illustrates a voltage time graph 370 demonstrating an overlaid series 374 of $V_{rect}$ voltages created by the adjustment of the $T_{boost}$ period. The voltages within the series 374 are stably differentiated from each other, and may qualify for use in ASK signaling. It should be understood that the switch sequencing scheme may be utilized for other types of amplitude modulation-based communication including amplitude and phase shift keying (APSK), On-Off keying (OOK), Quadrature Amplitude Modulation (QAM), and others.

It is noted that dynamic boosting can cause oscillations in the $V_{rect}$ signal, as shown in graphs 354, 358. These oscillations may be reduced via the implementation of various circuitry and controller inputs. For example, $V_{rect}$ oscillations may be reduced via an timer-implemented adaptive turn-off mechanism, wherein combinations of switches 230, 232, 234, 236 are forced off when a maximum on timer (e.g., $T_{on,max}$) expires. A digital control loop then adjusts $T_{on,max}$, resulting in an oscillation suppression due to a delayed induced reverse current. In another example, the rectifier circuit 200 may include a comparator configured to sense $V_{rect}$ dv/dt (e.g., via a slope detector) and dynamically increase $T_{boost}$ when $V_{rect}$ is dropping. The closed loop PID controller 244 may also be configured to suppress oscillations. For example, a PID input can be a target voltage, and the resultant PID output controls the boost amount.

Figure 4A:
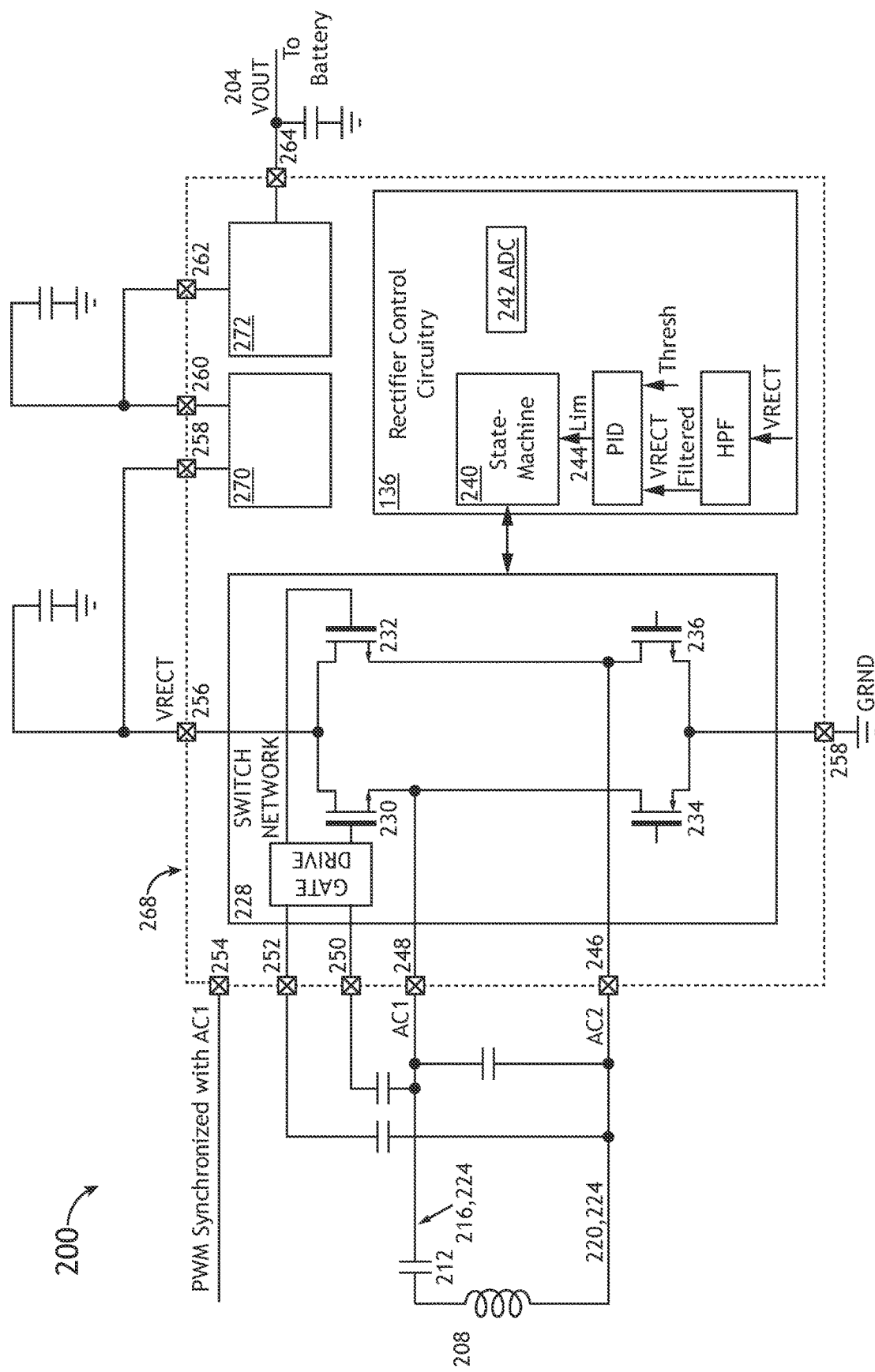
FIG. 4A is a circuit diagram illustrating a rectifier circuit, in accordance with one or more embodiments of the disclosure.

The rectifier control circuitry 136 may also boost $V_{rect}$ voltage if a load impedance of the coil network (e.g., coil 208) and/or the wireless power receiver 128 is inductive and the switch network 228 modulates an input capacitance, or if the load impedance of the coil network and/or the wireless power receiver 128 is capacitive and the switch network 228 modulates the input inductance. For example, the rectifier control circuitry 136 may be configured to modulate an inductance of the wireless power input when a load impedance of the coil network or the wireless power receiver 128 is capacitive. In another example, the rectifier control circuitry 136 may be configured to modulate a capacitance of the wireless power input when a load impedance of the coil network or the wireless power receiver 128 is inductive. In both cases, the input capacitance and the input inductance can be modified by adjusting $I_{lim}$ thresholds (e.g., switching thresholds for individual switches 230, 232, 234, 236 within the switch network 228). For example, the input capacitance can be modulated using negative $I_{lim}$ phase shifting (e.g., using negative $I_{lim}$ thresholds) via the state machine 240 within the rectifier control circuitry 136. In another example, the input inductance may be modulated using positive phase shifting (e.g., using positive $I_{lim}$ thresholds) via a revised state machine 240. FIG. 4A illustrates a rectifier circuit 200 wherein the PID controller 244 receives $V_{rect}$ data and threshold data, and sends an $I_{lim}$ signal to the state machine 240, wherein the switching thresholds are adjusted based on the $I_{lim}$ signal.

Figure 4B:
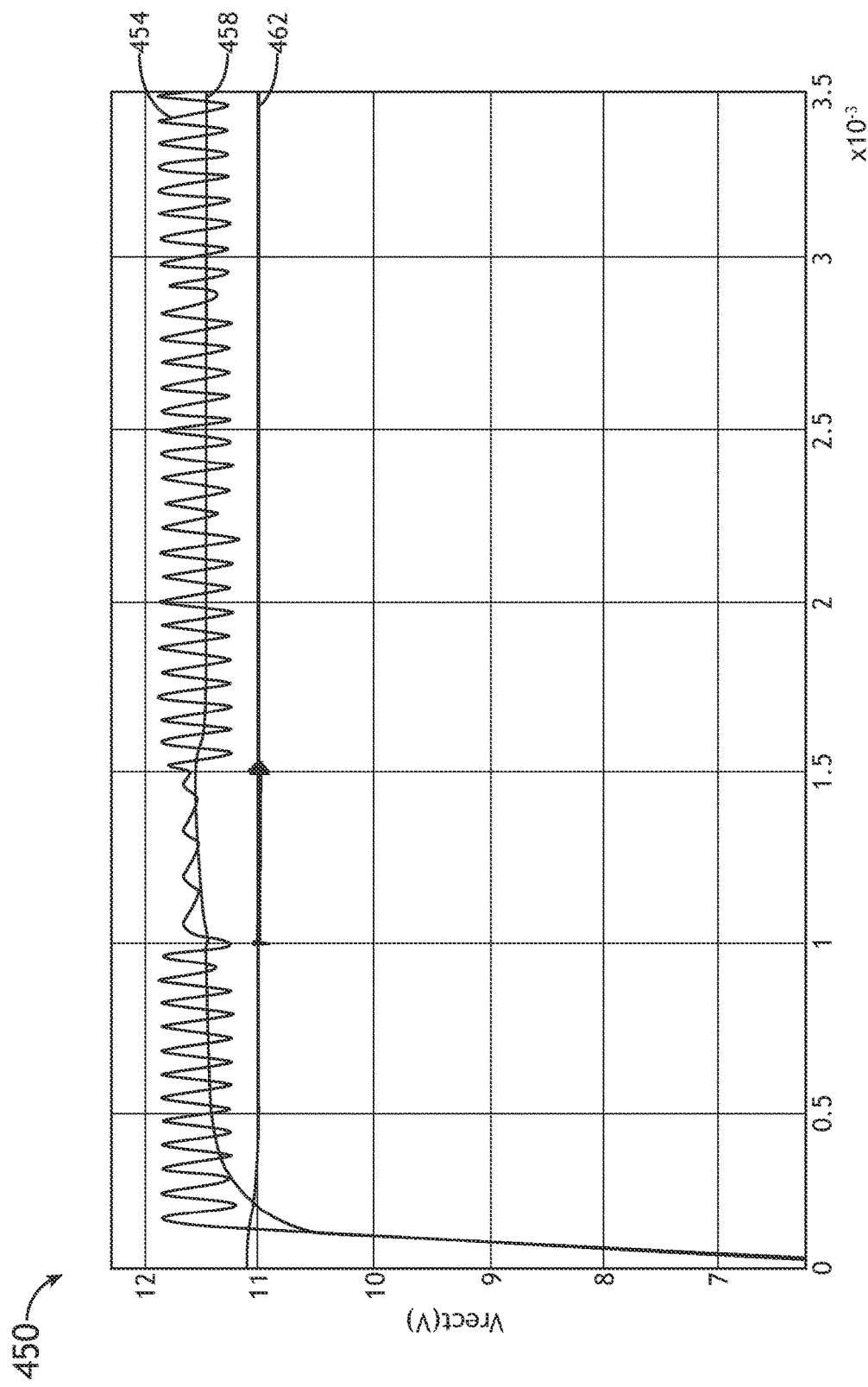
FIG. 4B is a graph illustrating a voltage/time plot for a rectifier circuit, in accordance with one or more embodiments of the disclosure.

In embodiments, the rectifier control circuitry 136 may reduce noise in $V_{rect}$ signals by decreasing instability within the function of the rectifier circuit 200, as there are several potential sources of instability in and around the rectifier circuit 200 including but not limited to: input impedance being greater than network source impedance and 180° out of phase; an output signal resistance becoming negative or close to zero; problems with load ballast stability; and oscillations in $V_{rect}$. Problems arising due to these issues, such as $V_{rect}$ oscillations, may be reduced in magnitude by controlling switching within the rectifier via the rectifier control circuitry. In embodiments, the rectifier control circuitry 136 may reduce oscillation, ripple, and other noise in $V_{rect}$ signals by incorporating a high pass filter (HPF 404) that filters incoming $V_{rect}$ signals, and sends the filtered $V_{rect}$ signal to the PID controller 244. The HPF 404 may be configured to filter any band or band size of signal. For example, the HPF 404 may be configured as a 500 kHz filter. For instance, the HPF 404 may be used to filter an incoming $V_{rect}$ signal, for which the filtered signal then passes through the PID controller 244 where $I_{lim}$ is adjusted (e.g., approximately +/−400 mA). An example result of using the filtered $V_{rect}$ signal and the adjusted $I_{lim}$ thresholds (e.g., fast $I_{lim}$ control) to reduce oscillation is shown in graph 450 of FIG. 4B. Here, a $V_{rect}$ baseline 454 is shown as highly oscillatory. The oscillations are muted upon adjusting Ilim, resulting in a modulated $V_{rect}$ 458 that is similar to the input voltage 462. In embodiments, the phase shifting (e.g., positive and/or negative) may be performed via a digital phase locked loop (DPLL).

In embodiments, the rectifier circuit 200 uses a configurable speed function to match switching events to the programmed switch time. For example, at high frequencies, small power losses may occur due to switching events not occurring at the exact moment in time, such as when a forward diode is about to turn on, or when the switch 230-236 is programmed to switch to an OFF state when current is close to 0 mA. Initially, these switching events may be optimally calibrated or factory set. However, switch times can change with changes in load current, $V_{rect}$, and other parameters. These low accuracy switch events can be pushed to switch at the proper time using configurable speed protocols, such as those used in UART-based communications.

In embodiments, a predictive switching scheme may be used to more closely coordinate switching events at the correct time. For example, the predictive switching scheme may include measuring (e.g., via a fast comparator) the timing error created by using the switch logic, and adjusting the ON/OFF switch thresholds to compensate for the switch logic delay. The measuring and adjusting may then be repeated iteratively to achieve switching with greater accuracy. The predictive switching scheme may also include periodically performed measurements and adjustments to limit excess power consumption from the fast comparators. The predictive switching scheme may also use a fast comparator, as mentioned above, to provide near-ideal time switching, but in order to save power, the fast comparator is only powered up around switching events. Digital timers would then be used to determine when to power up and down the fast comparator.

Stability of the rectifier circuit 200 may be further improved upon an addition of timers (e.g., qualification timers) for the ½ period and full period switch ON events in the state machine 240. For example, when the carrier frequency is known, switching can be forced within the rectifier circuit 200 via the timers so as to fit the required duty cycle parameters and counteract oscillations caused by destabilizing ON/OFF switching events.

The rectifier circuit 200 may also be configured to derive clocks and timers when a power signal runs through the rectifier circuit 200. For example, FCLK and FCLK metrics (e.g., a clock fidelity metric) may be utilized for a variety of functions including but not limited to coding/decoding (e.g., FSK decoding), and providing reference times (e.g., for UART and USB timing functions). In embodiments, the rectifier circuit 200 determines one or more FCLKs metrics (e.g., FCLK fidelity metrics) that are used to determine the stability and/or fidelity of processes within the rectifier circuit (e.g., a signal quality metric). For example, a FCLK fidelity metric based on signal noise (e.g., noise metrics) may be used to determine whether the rectifier circuit 200 is functioning correctly and whether signals passing through the rectifier circuity are usable for further processing. For instance, the noise metric may include data corresponding to a noise threshold or a current noise level that is currently experienced by the rectifier circuit 200. The noise metric may be particularly used describe or report ripple noise (e.g., a fluctuating AC component in the rectified DC output). The noise metric may also particularly used to describe or report switching noise or jitter (e.g., the deviation from true periodicity of a presumably periodic signal). For example, the rectifier control circuitry 136 may be configured to generate a noise metric, which is then used by the rectifier control circuitry 136 and or the system controller 140 to determine jitter (e.g., a jitter value) for the rectifier circuit 200.

The rectifier circuit 200 may also generate a noise metric for determining whether a signal meets a threshold for decoding communication signals, such as signals for ASK preambles. The noise metric may report, or assist in determining, signal decoding thresholds (e.g., parameters or settings for determining if a received signal is message or noise). For example, if the signal decoding threshold for a transmitted ASK signal is set too low, the receiver control circuitry 136 or system controller 140 may inappropriately interpret noise as an incoming ASK preamble. Setting the signal decoding threshold too high may result in the receiver control circuitry 136 or system controller 140 missing ASK preambles.

FCLK metrics may include the reporting of on/off periods (e.g., cycling periods) for each state machine 240 so that duty cycle of the FCLK signal can also be measured. The FCLK metrics are determined via rectifier control circuitry 136 or processors 144 of the system controller 140.

In embodiments, the FCLK fidelity metric is configured to measure the switch OFF and/or switch ON intervals of one or more switches 230-236 within the switch network 228. For example, the rectifier circuit 200 may include one or more comparators that measure when the carrier signal is high and/or low, as well as timers that can measure the duration of these on/off periods. From these time measurements, a jitter metric for the FCLK can be derived (e.g., via root mean square (RMS) and/or deviation calculations). This FCLK jitter metric (e.g., such as a jitter magnitude or other noise metric) can then be used to determine proper baud rates, FSK model settings, or other communication related settings for the rectifier circuit 200. For example, the FCLK jitter metric may be used to determine a baud rate between the user device 100 and the wireless charger 108. These FCLK fidelity metrics, and other signal quality metrics, can be derived via either analog or digital timers and related circuitry.

In embodiments, signal quality metrics are used to determine $V_{rect}$ fidelity. For example, $V_{rect}$ can be measured and passed through a high pass filter to remove low frequency noise, with the resultant filtered $V_{rect}$ signal then used to calculate an RMS error value (e.g., a quality metric). The quality metric may be used within further calculations/analysis to determine stability problems within the rectifier circuit, and otherwise determine a working state of the rectifier circuit 200. For example, the $V_{rect}$ quality metric may be used to determine if the rectifier control circuitry 136 has been programmed incorrectly. In another example, the $V_{rect}$ quality metric may be used to determine if specific components within the rectifier circuit 200 have failed.

In embodiments, signal quality metrics are used in threshold detection of communication signals, such as for the detection of preambles in ASK signals. For example, circuitry within the rectifier circuit 200, or existing modem circuitry, may be configured to measure the down-converted signals of ASK messages or otherwise monitor the noise on the coil network, and generate a signal metric that can be used to determine an ASK preamble threshold. The signal metric may include determining signal magnitude values and accumulating RMS errors based on those magnitude values. For example, high ASK signal and noise may produce higher RMS values. The signal metric may then be used to adjust threshold values.

It is to be understood that embodiments of the methods disclosed herein may include one or more of the steps described herein. Further, such steps may be carried out in any desired order and two or more of the steps may be carried out simultaneously with one another. Two or more of the steps disclosed herein may be combined in a single step, and in some embodiments, one or more of the steps may be carried out as two or more sub-steps. Further, other steps or sub-steps may be carried in addition to, or as substitutes to one or more of the steps disclosed herein.

Although inventive concepts have been described with reference to the embodiments illustrated in the attached drawing figures, equivalents may be employed and substitutions made herein without departing from the scope of the claims. Components illustrated and described herein are merely examples of a system/device and components that may be used to implement embodiments of the inventive concepts and may be replaced with other devices and components without departing from the scope of the claims. Furthermore, any dimensions, degrees, and/or numerical ranges provided herein are to be understood as non-limiting examples unless otherwise specified in the claims.

What is claimed is:

1. A system comprising:
    a first circuit for a first apparatus, comprising:
        a first receiver configured to receive a wireless power input from a second apparatus;
        a switch network comprising a plurality of switches, wherein the switch network is operatively coupled to a first conductor, wherein the switch network is further configured to rectify the wireless power input and generate a rectified voltage;
        the first conductor operatively coupled to the first receiver and the switch network, wherein the first conductor is configured to transmit a first alternating current having a first voltage to the switch network;
        a second conductor operatively coupled to the first receiver and the switch network, wherein the second conductor is configured to transmit a second alternating current having a second voltage to the first receiver;
        a first controller configured to:
            determine a rectified voltage signal in response to a transition of the first voltage or the second voltage; and
            transmit a signal input to at least one switch of the switch network based on the rectified voltage signal to change an ON/OFF state of the at least one switch of the switch network, wherein a resultant change of the ON/OFF state of the at least one switch modulates the rectified voltage;
        wherein the system further comprises a boost switch comprising a first field effect transistor electrically coupled to the first conductor and the first controller, the boost switch is configured to modulate an impedance of the first conductor in response to a control signal from the first controller by configuring an ON/OFF state of the boost switch; and
        wherein the first controller is configured to modulate the rectified voltage by applying a pulse-width-modulation (PWM) signal to the boost switch, the PWM signal is synchronized to the first voltage or the second voltage.

2. The system of claim 1, wherein the first field effect transistor comprises:
    a source conductor operatively coupled to the first conductor; and
    a drain conductor operatively coupled to the first conductor, forming a first loop comprising the first conductor, the source conductor, and the drain conductor, wherein the first loop further comprises:
        a first capacitor operatively coupled to the first conductor; and
        a second capacitor operatively coupled to the drain conductor.

3. The system of claim 1 wherein the plurality of switches includes:
    a first high-side switch;
    a first low-side switch;
    a second high-side switch; and
    a second low-side switch.

4. The system of claim 3, wherein the first controller is configured to:
    switch the second low-side switch to an ON state when the second voltage has transitioned from crest to trough, and switch the second low-side switch to an OFF state when the second voltage has initiated a transition from trough to crest;
    switch the first high-side switch to the ON state when the first voltage has transitioned from trough to crest, and switch the first high-side switch to the OFF state when the first voltage has initiated a transition from crest to trough;
    switch the first low-side switch to the ON state when the first voltage has transitioned from crest to trough, and switch the first low-side switch to the OFF state when the first voltage has initiated a transition from trough to crest; and
    switch the second high-side switch to the ON state when the second voltage has transitioned from trough to crest and switch the second high-side switch to the OFF state when the second voltage has initiated transition from crest to trough.

5. The system of claim 4, wherein the first low-side switch and the second low-side switch are configured in the ON state for an overlapping time period, whereupon switching at least one of the first low-side switch or the second low side switch to the OFF state causes a change in an impedance of the first conductor and an increase in the rectified voltage.

6. The system of claim 5, wherein the increase in rectified voltage is used for amplitude modulation-based communication by modulating the impedance of the first conductor.

7. The system of claim 6, wherein the amplitude modulation communication includes amplitude shift keying (ASK);
wherein the system is configured to generate a noise metric for determining a threshold for decoding an ASK signal.

8. The system of claim 1 wherein the first controller comprises a state machine and a proportional-integral-derivative (PID) controller.

9. The system of claim 1, wherein the signal input is based on a current limit value.

10. The system of claim 1, wherein the first controller is configured to modulate a capacitance of the wireless power input when a load impedance of the first receiver is inductive.

11. The system of claim 1, wherein the first controller is configured to modulate an inductance of the wireless power input when a load impedance of the first receiver is capacitive.

12. The system of claim 1, wherein the first controller further comprises a proportional-integral-derivative controller configured to adjust a current limit value based on the rectified voltage.

13. The system of claim 1, wherein the controller is configured to generate a noise metric, wherein the controller determines a jitter value based on the noise metric.

14. The system of claim 1, wherein the controller is configured to generate a quality metric based on the rectified voltage signal, wherein a working state of the first circuit is determined based on the quality metric.

15. The system of claim 1, wherein the system is configured to generate a signal metric, wherein a signal decoding threshold of a communication signal is determined based on the signal metric.

16. A device comprising:
a first circuit for a first apparatus, comprising:
a switch network comprising a plurality of switches, wherein the switch network is operatively coupled to a first conductor, wherein the switch network is further configured to rectify a wireless power input from a first receiver and generate a rectified voltage;
the first conductor operatively coupled to the first receiver and the switch network, wherein the first conductor is configured to transmit a first alternating current having a first voltage to the switch network;
a second conductor operatively coupled to the first receiver and the switch network, wherein the second conductor is configured to transmit a second alternating current having a second voltage to the first receiver; and
a first controller configured to:
determine a rectified voltage signal in response to a transition of the first voltage or the second voltage; and
transmit a signal input to at least one switch of the switch network based on the rectified voltage signal to change an ON/OFF state of the at least one switch of the switch network, wherein a resultant change of the ON/OFF state of the at least one switch modulates the rectified voltage;
wherein the device further comprises a boost switch comprising a first field effect transistor electrically coupled to the first conductor and the first controller, the boost switch is configured to modulate an impedance of the first conductor in response to a control signal from the first controller by configuring an ON/OFF state of the boost switch; and
wherein the first controller is configured to modulate the rectified voltage by applying a pulse-width-modulation (PWM) signal to the boost switch, the PWM signal is synchronized to the first voltage or the second voltage.

17. A system comprising:
a first circuit for a first apparatus, comprising:
a first receiver configured to receive a wireless power input from a second apparatus;
a switch network comprising a plurality of switches, wherein the switch network is operatively coupled to a first conductor, wherein the switch network is further configured to rectify the wireless power input and generate a rectified voltage, wherein the switch network is integrated into an integrated circuit chip;
the first conductor operatively coupled to the first receiver and the switch network, wherein the first conductor is configured to transmit a first alternating current having a first voltage to the switch network;
a second conductor operatively coupled to the first receiver and the switch network, wherein the second conductor is configured to transmit a second alternating current having a second voltage to the first receiver;
a first field effect transistor electrically coupled to the first conductor and configured to receive a power input and output an output voltage back to the first conductor based upon a signal input, wherein the first field effect transistor is physically separated from the integrated circuit chip; and
a first controller configured to:
determine a rectified voltage signal in response to a transition of the first voltage or the second voltage; and
transmit the signal input to the first field effect transistor;
wherein the first field effect transistor is configured to modulate an impedance of the first conductor in response to a control signal from the first controller by configuring an ON/OFF state of the boost switch; and
wherein the first controller is configured to modulate the rectified voltage by applying a pulse-width-modulation (PWM) signal to the boost switch, the PWM signal is synchronized to the first voltage or the second voltage.

* * * * *